Aug. 23, 1955     F. H. GEHRI     2,716,027
GYMNASTIC APPARATUS
Filed Feb. 10, 1953
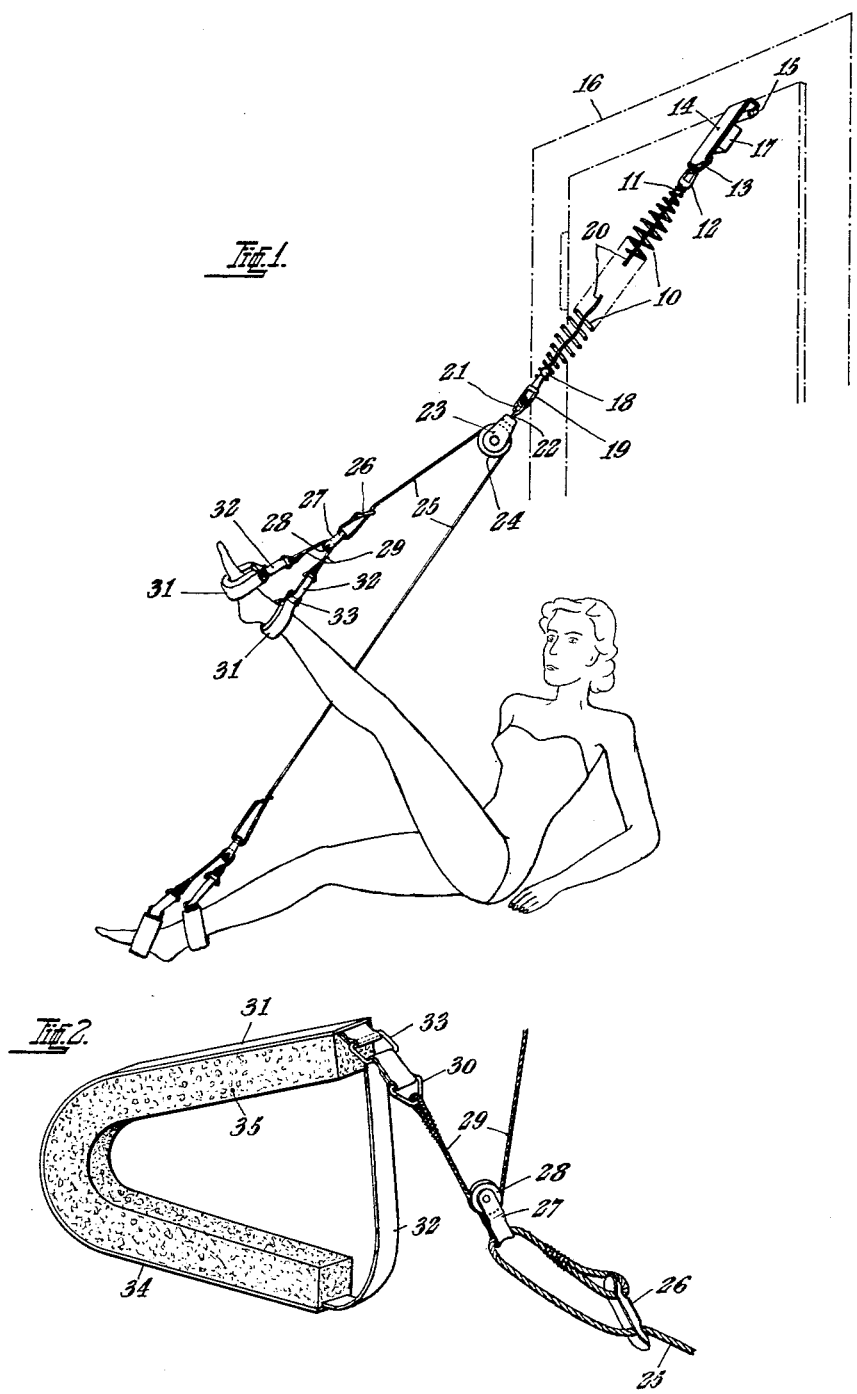
INVENTOR:
FRITZ HENRY GEHRI United States Patent Office 2,716,027
Patented Aug. 23, 1955

2,716,027

GYMNASTIC APPARATUS

Fritz Henry Gehri, Bern, Switzerland

Application February 10, 1953, Serial No. 336,165

Claims priority, application Switzerland May 28, 1952

6 Claims. (Cl. 272—83)

This invention relates to a novel gymnastic apparatus.

It is an object of the present invention to provide means for removably attaching said apparatus to a support such as a door and door-jamb.

It is a further object of the invention to provide means protecting said support against injury and marring upon contact with said apparatus.

Another object of the invention is to provide means furnishing multiple support for at least two limbs of an operator when exercising with the apparatus.

Yet another object is to provide a support for the limbs of said operator which is comfortable, self-adjusting and secure.

Still another object of this invention is to provide means permitting substantially free and unhampered movement of said apparatus about said support.

A further object is to provide an apparatus of the class described which is inexpensive to manufacture, simple to use, and attractive in appearance.

With these and other objects in view, the invention will be described by reference to the accompanying drawing, in which:

Fig. 1 is a perspective illustration of the gymnastic apparatus in operative position, and Fig. 2 shows a detail thereof in perspective and on an enlarged scale.

The gymnastic apparatus comprises a coil spring 10 which can be extended to more than three times its non-extended length and which is joined by means of a ring 12 connected to one of the tapered spring ends 11, through the intermediary of a triangular ring 13 to a length of webbing 14. A pin 15 is attached to the free end of the webbing 14 to prevent same, while the latter may be clamped into the gap of a door 16 shown in the drawing by dash-dot lines, from slipping out, when the leaf of the door is closed. On the flat side of the length of webbing 14 facing the leaf of the door, there is secured a pressure-elastic buffer 17 consisting, by way of example, of sponge rubber to prevent the spring 10 from coming into contact with the leaf of the door in its freely suspended position of rest.

At the other tapered end 18 of the spring 10, a further ring 19 is secured which is connected with the ring 12 by a rope 20 of a definite length passing within the spring, said rope preventing over-stretching of the spring 10. A second ring 21 engages this ring 19, said ring 21 carrying by means of a pin 22 a carrier 23 capable of pivoting about the axis of said pin 22, a pulley 24 being rotatably mounted in said carrier 23 at right angles to the axis of the pin 22. Passing over the pulley 24 there is a rope 25 consisting, by way of example, of nylon, the two strands of said rope 25 each passing through a hole of an adjusting plate 26 (Fig. 2) and then through a U-shaped pulley carrier 27 and being secured by their ends to the respective adjusting plates 26 so that the length of the strands of the rope 25 can be altered by means of said adjusting plates.

A length of rope 29 passes over the pulley 28 (Fig. 2) of each pulley carrier 27, the two ends of the rope 29 being secured to a cuff-shaped support 31 each by means of a triangular ring 30 and a length of webbing 32, said length of webbing passing from one end of the cuff-shaped support 31 through a rectangular ring 33 arranged at the other end of the support 31, thus to be capable in the fashion of a noose of contracting or extending said support 31 intended to surround a limb or part of a human body, such as the foot, the ankle joint, the wrist, the arm or the metacarpal portion of the hand.

The support cuff 31 consists of flexible material, preferably of a length of webbing 34, to the flat inside surface of which a pressure-elastic padding strip 35, for instance of sponge rubber, is secured which is capable of yieldably conforming to the part of the body surrounded by the support cuff.

The gymnastic apparatus described enables parts of the human body to be elastically suspended and thus to be relieved partly of their own weight so that by the use of the apparatus numerous bodily exercises may be carried out without difficulty and relaxedly for the purpose of muscular training, massaging, increasing the suppleness of the body, improving the blood circulation and breathing, and also for hygienic gymnastics. By way of example, both legs may with advantage be supported by slipping each foot through one of the two support cuffs 31 attached to the same strand of the rope 25, when the noose is extended, and by positioning the support 31 with the elastic padding 35 against the leg just above the ankle joint on contracting the noose, whilst the second support cuff is laid around the metatarsal portion of the foot in a similar manner. In a like manner the two support cuffs of each strand of the rope may be laid around the wrist and the metacarpal portion of the hand, or around the upper arm and the wrist. The provision of two supports at each end of the rope 25 and their connection over the pulley 28 ensures a comfortably distributed and balanced support of the respective parts of the body.

It can thus be seen that in accordance with the present invention there has been provided in a gymnastic apparatus for attachment to a support, the combination of spring-connected first pulley means arranged for pivotal rotation about an axis, a first rope trained over said first pulley means and terminating in two ends, with a plurality of engageable means each pair of the latter being positioned at each end of said first rope for engagement with a respective member of the human body, each engageable means including a U-shaped element, adjustable means extending across the ends of the legs of each U-shaped element and facilitating movement of said leg ends of said element with respect to each other about said member, and means supported by a respective end of said first rope and including second pulley means, a second rope trained over each second pulley means and terminating in two respective ends, each end of each second rope being operatively connected to said adjustable means of a respective element, whereby said U-shaped elements at each end of said first rope may be moved relative to each other about said second pulley means and through said first rope relative to said first pulley means and about said axis thereof.

While the preferred embodiment of the invention has been shown and herein described, it will be understood that the same is capable of modification without departure from the general scope and spirit of the invention as defined in the claims.

Having thus described the invention, what is claimed as new and desired to be secured by Letters Patent is:

1. A gymnastic apparatus for attachment to a support, comprising tension spring means having two ends, means attaching one end of said spring means to said support, pin means operatively connected to the other end of said tension spring means, pulley carrier means operatively connected to said pin means for rotation about the axis of said pin means, pulley means mounted on said carrier means having an axis of rotation extending perpendicular to said pin means, first rope means riding on said pulley means and having two ends, a plurality of further rope means operatively connected to each of said ends of said first rope means, respectively, for displacement relative to said ends of said first rope means, respectively, each of said further rope means having two ends, and limb supporting members operatively connected to each of said ends of said further rope means, respectively, whereby at least quadruple total engagement with two respective limbs of the human body is provided when exercising said body by means of said apparatus.

2. A gymnastic apparatus according to claim 1, wherein said attaching means comprises a strip of flexible material, and a pin secured to said strip remote from said spring means.

3. A gymnastic apparatus according to claim 2, including resilient buffer means secured to said strip for maintaining said spring means remote from said support when said apparatus is not being used.

4. A gymnastic apparatus according to claim 1, wherein said ends of said first rope means terminate in loops, including further pulley carrier means and further pulley means for each of said further rope means, respectively, serving to operatively connect said loops of said first rope means with said further rope means.

5. A gymnastic apparatus according to claim 1, wherein each of said limb supporting members includes a length of flexible material having two ends, a loop connected to one end of said length of material, and a strap extending from the other of said ends through said loop to the respective end of said further rope means, whereby said length of flexible material forms an enlarged receiver for a limb of an operator and is reduced in size upon movement of said limb against the action of said spring means.

6. In a gymnastic apparatus for attachment to a support; the combination of spring-connected first pulley means arranged for pivotal rotation about an axis, a first rope trained over said first pulley means and terminating in two ends, with a plurality of engageable means each pair of the latter being positioned at each end of said first rope for engagement with a respective member of the human body, each engageable means including a U-shaped element, adjustable means extending across the ends of the legs of each U-shaped element and facilitating movement of said leg ends of said element with respect to each other about said member, and means supported by a respective end of said first rope and including second pulley means, a second rope trained over each second pulley means and terminating in two respective ends, each end of each second rope being operatively connected to said adjustable means of a respective element, whereby said U-shaped elements at each end of said first rope may be moved relative to said other about said second pulley means and through said first rope relative to said first pulley means and about said axis thereof.

References Cited in the file of this patent

UNITED STATES PATENTS

| 232,579 | Weeks | Sept. 21, 1880 |
| 448,305 | Thayer | Mar. 17, 1891 |
| 605,237 | Spink | June 7, 1898 |
| 664,210 | Byron | Dec. 18, 1900 |
| 775,989 | Roberts | Nov. 29, 1904 |
| 864,188 | Patterson | Aug. 27, 1907 |
| 1,123,272 | Goodman | Jan. 5, 1915 |
| 1,307,905 | Hendrickson | June 24, 1919 |

FOREIGN PATENTS

| 356,572 | Germany | July 21, 1922 |